United States Patent [19]
Mu et al.

[11] Patent Number: 5,343,524
[45] Date of Patent: Aug. 30, 1994

[54] INTELLIGENT SECURITY DEVICE

[76] Inventors: Xiao-Chun Mu, 19070 Dagmar Dr., Saratoga, Calif. 95070; Kai J. Chin, 41069 Bairo Ct., Fremont, Calif. 94539; Feiying Chen, 771 Woodhams Rd., Santa Clara, Calif. 95051

[21] Appl. No.: 718,603

[22] Filed: Jun. 21, 1991

[51] Int. Cl.⁵ .................................................. H04L 9/04
[52] U.S. Cl. .......................................... 380/4; 380/25
[58] Field of Search ................................... 380/4, 25

[56] References Cited

U.S. PATENT DOCUMENTS

| | | | |
|---|---|---|---|
| 4,593,384 | 6/1986 | Kleijrve | 380/4 |
| 4,633,388 | 12/1986 | Chiu | 380/4 |
| 4,635,223 | 1/1987 | Boone et al. | 380/4 |
| 4,683,553 | 7/1987 | Mollier | 380/4 |
| 4,683,968 | 8/1987 | Appelbaum | 380/4 |
| 4,691,350 | 9/1987 | Kleijne et al. | 380/4 |
| 4,764,959 | 8/1988 | Watanabe et al. | 380/4 |
| 4,807,284 | 2/1989 | Kleijne | 380/4 |
| 4,811,288 | 3/1989 | Kleijne et al. | 380/4 |
| 4,823,308 | 4/1989 | Knight | 380/4 |
| 4,905,277 | 2/1990 | Nakamura | 380/4 |
| 4,975,950 | 12/1990 | Lentz | 380/4 |
| 5,027,397 | 6/1991 | Double et al. | 380/4 |
| 5,034,980 | 7/1991 | Kubata | 380/4 |
| 5,048,085 | 9/1991 | Abraham et al. | 380/25 |
| 5,109,413 | 4/1992 | Comerford et al. | 380/4 |
| 5,148,481 | 9/1992 | Abraham et al. | 380/46 |
| 5,200,998 | 4/1993 | Bakaher et al. | 380/4 |

OTHER PUBLICATIONS

Micro Security Systems, Inc., "Maximum Software Security", advertisement for securi key.
ProTech Marketing, Inc. "well never tell ...", advertisment.

*Primary Examiner*—Salvatore Gangialosi
*Attorney, Agent, or Firm*—Michael J. Hughes

[57] ABSTRACT

An intelligent security device (10) is disclosed for protecting computer software from unauthorized use. The security device (10) is a hardware device having within a microprocessor (36) for interacting with a host computer (32) such that protected software may not be operated unless the security device (10) is in place. Physical duplication of the security device (10) will not result in a workable copy, due to the nature of the microprocessor (36), which is such that information is encoded therein and further such that encryption codes are also stored therein and cannot be discovered after the microprocessor (36) is locked by any known means. A system clock (21) within the microprocessor (36) is adaptable to the purpose of permitting use of the protected software only within limited time parameters.

7 Claims, 3 Drawing Sheets

INTELLIGENT SECURITY DEVICE

TECHNICAL FIELD

The present invention relates generally to the protection of proprietary software against unauthorized usage, and more particularly to a method for accomplishing such protection employing a hardware key type device for attachment to a computer, which device must be in place in order to access the software. The predominant current usage of the intelligent security device of the present invention is as a means for preventing unauthorized access to protected software from a personal computer or a computer workstation.

BACKGROUND ART

One of the most pressing issues that has evolved as a result of high technology concerns the various attempts which have been made to protect a programmer's investment in the fruits of his or her labor. Both technical and legal approaches have been tried, but the fact that "software piracy" remains a major problem speaks well to the reality that all attempts to date have been less than totally successful.

There has been a great deal of effort expended in attempts to prevent the making of unauthorized copies of software. While some of these attempts have been more successful than others, most such schemes are defeated soon after they are announced. Furthermore, schemes which make it considerably more difficult to use the software often have the net effect of discouraging legitimate purchasers, thus making it a better business decision to risk piracy by foregoing any form of copy protection. Obviously the more valuable the program, the more incentive there is to expend time and money in an illegitimate effort to copy it, and the greater is the incentive to create a "pirate-proof" protection scheme.

Some recent efforts at software protection have been directed at a hardware solution to the problem. A general system of operation utilized within hardware security devices is to have encrypted therein a code or identifier which is needed to interact with a protected program in order for that program to function. For example, one variation of this general theme is to have a code number within the hardware device which must be decrypted and identified by the software. Another variation is to have decryption information within the hardware device which must be used either to identify the software or to, in fact, decode all or part of it prior to usage. More complicated variations include multi-level encryption such as, for example, having software which must be decrypted using an encryption table found within the hardware and then further decrypted within the software itself. Of course, numerous other variations on this general scheme are possible, and many of them have been used with varying degrees of success.

U.S. Pat. No. 4,683,968, issued to Appelbaum et al., teaches a hardware device and method for using same which uses a triple encryption scheme in which part of the decryption code resides in the software and part resides in the hardware. In an alternative version, decryption is made even more difficult by scattering the software portion of the code throughout the program and the like. While this method undoubtedly makes unauthorized use of the software extremely difficult, and in fact financially unfeasible in many instances, it is not immune to the efforts of pirates. Code residing within the Appelbaum device can be discovered if the device can be successfully opened. Although Appelbaum correctly suggests that the device can be made such that it is extremely difficult to open without destroying the code, no suggestion is made that this is impossible. Furthermore, as for the effect of making the portion of the decrypting scheme which resides in software very difficult to decode, while the difficulty is undeniable, no suggestion is made that it is impossible.

Yet another hardware device and an associated method which have been developed for the subject purpose are taught in U.S. Pat. No. 4,683,553 issued to Mollier. This method renders the protected programs non-executable in the state in which they are delivered to users, and utilizes a hardware key which must be employed in order to read the program into a computer's primary storage memory in an executable form. This method also is quite effective to make the copying of programs economically unfeasible as to many software programs. However, the Mollier method does rely upon a look up table which resides within the hardware portion, which table can be read and duplicated by one with sufficient financial incentive. Therefore, it would be entirely possible for an unscrupulous person to duplicate this hardware key, and thus to produce multiple executable copies of the program.

A simple device which is, in some ways, similar to the Mollier invention, is marketed by ProTech~ marketing, Inc. of 9600-J Southern Pine Boulevard, Charlotte, N.C. The ProTech~ device is constructed so as to fit on a standard computer RS-232 serial communications port, and further so that some external device or devices (such as, for instance, a serial printer and/or a modem) can be connected to the ProTech~ device. An object of the ProTech~ device is to allow the external device connected to it (in this instance, the serial printer or the modem) to communicate with the subject computer in a normal manner, while still providing a means for that computer to access the device itself. The ProTech~ device contains an apparatus which is referred to by the manufacturers as a microprocessor. The nature of this apparatus is that it contains "look up tables" in a memory which can be accessed to ensure that the device is in place. If the program in question does not detect that the device is in place, then the program will not run. The fact that the ProTech~ device is relatively inexpensive to manufacture undoubtedly makes it a viable economic choice in many instances.

Yet another example of the prior art is the Activator~ manufactured by Software Security~ of 1011 High Ridge Road, Stamford, Conn. This device is also adapted to fit on a computer communications port. It employs an application specific integrated circuit (ASIC) to perform in much the same manner as the ProTech~ device. Although it would be very difficult to decode key information encoded and stored within the Activator~ device, as with the ProTech~ device, a sufficiently motivated thief could duplicate the Activator~ device, along with the encoded information therein, without necessarily understanding the meaning of that encoded information. Unfortunately, this would be sufficient to result in a working copy of the original device.

The utility of security devices which utilize simple look up tables or ASICs is well known. Such devices are cost effective and function to protect low cost software quite adequately. However, such devices are not intended for those applications wherein it is economically feasible for a software thief to expend a substantial amount of time and money in an effort to defeat a software protection system. It is really a very simple and inexpensive matter for one skilled in the art to "read" the encoded data in the memory of such devices and to duplicate it or, in the case of ASIC based devices, to duplicate the device itself. It is important to note that it is not even necessary that such a person understand the encoded data in order to duplicate it.

A feature which has been considered for application to hardware key devices has been the inclusion of a means for controlling the amount of time during which a user has access to the subject software. In many cases, a temporary license is granted for the use of software, or some other time contingent arrangement is made. However, once an owner has turned over all of the software and hardware necessary to operate a program, the matter is really out of his or her control. Some devices have attempted to use system clocks to determine the amount of usage to which the program is subject, or to stop usage of the program after a predetermined time. However, the system clock is within the control of the user, and avoidance of this attempted protection is easy.

All of the prior art software protection devices within the inventors' knowledge have offered less than an ideal solution to the problem. Many have been difficult to install and have required connection to external power sources to operate. Alternatively, those which have been easier to install and/or have not required external power have been relatively easy to duplicate by unscrupulous persons. Furthermore, none of the prior art software protection devices within the inventors' knowledge have provided an adequate means for controlling access to software within a predetermined time frame.

While several prior art devices have made life difficult for software pirates, no prior art software protection device to the inventor's knowledge has successfully employed a scheme in which the necessary security device cannot be duplicated using known methods.

All successful applications to date have utilized some variation of a look up table for decryption of data, which look up table is encoded in some form of memory which can be accessed and duplicated using known technology.

DISCLOSURE OF INVENTION

Accordingly, it is an object of the present invention to provide a security device for software which does not rely upon the physical inaccessibility of its component parts to prevent access to a decoding scheme concealed therein.

It is another object of the present invention to provide a security device for software which does not rely upon encryption or other contrivances within the software to foil would be duplicators.

It is still another object of the present invention to provide a security device for software which cannot be duplicated, in all of its pertinent parts, using any known technology.

It is yet another object of the present invention to provide a method for protecting software which prevents unauthorized use of the software.

It is still another object of the present invention to provide a software security means which can be easily installed by an end user, and further which can be easily transported to alternative sites if such transport is allowed within the specific scheme of the protection.

It is yet another object of the present invention to provide a software security means which is economical to produce and reliable in operation.

It is still another object of the present invention to provide a software security means which is versatile in the sense that software suppliers may employ the device to accomplish a great variety of equipment restrictions, user restrictions, time restrictions, access restrictions within a computer network, or any combination thereof, as well as to accomplish other restrictions which may now be contemplated or which may be found to be desirable in the future.

It is yet another object of the present invention to provide a software security means which does not require special connection to an external power source, and further which does not require batteries or other sources of power which might require periodic maintenance.

It is still another object of the present invention to provide a software security device having processing capabilities which may be accessed, at a programmer's discretion, for purposes other than the primary security purpose.

It is yet another object of the present invention to provide a software security means which can restrict access to software according to time parameters, which means cannot be affected by altering characteristics of an external time source and further which uses an internal time source which cannot be altered without destroying the device and thus preventing further access to the subject software.

Briefly, the preferred embodiment of the present invention is a hardware device having therein a microprocessor with an integrated central processing unit, memory portion, timing and control portion, and universal asynchronous receiver/transmitter ("UART") portion. A characteristic of the microprocessor is that data is stored therein in an encrypted form and further that the encryption occurs within the microprocessor itself using an encryption code which is also stored in the memory of the microprocessor. Similarly, data which is output from the microprocessor is decrypted within the microprocessor itself. When the microprocessor is "locked" the encryption code cannot be read therefrom by any known means (except, perhaps, in encrypted form) nor may the microprocessor be "unlocked" by any known means without destroying the encrypted data codes. Any attempt to open the microprocessor would inevitably result in the destruction of the device, and no information regarding data which had been stored therewithin could be gained thereby. Because the software for accessing and manipulating data stored within the inventive device is also stored therein, and because the nature of the microprocessor within the inventive device is such that data cannot be retrieved and reinserted into another similar device without going through at least one more encryption process, and because the necessary encryption code for accomplishing such a duplication without producing hopelessly scrambled and unusable data is locked within the device and cannot be retrieved (even by the user who originally put it there), a workable copy of the inventive device cannot be produced by any known means. Additionally, any attempt to access or alter the timing and control portion of the microprocessor will inevitably result in the destruction of the unit, and no benefit would be gained thereby.

A feature of the present invention is its versatility. The inventors believe that the present invention may be used to implement any known identification and/or cross checking security scheme, as well as a nearly infinite number of possible protection schemes which might be devised in the future. The example of this employed herein in conjunction with the best presently known embodiment of the invention requires the inventive intelligent security device, upon a request from the protected operational program, to calculate the answer to a complex calculation using information encoded within the security device and to return the answer to the program. Using known programing techniques, the data which is that answer has been made necessary to the operation of the program.

While the scope of the present invention is not limited thereby, the best presently known embodiment of the invention is designed to be attached by means of a first RS-232 connector to a serial communications port of a personal computer or of a computer workstation. Furthermore, the best presently known embodiment of the invention includes a second RS-232 connector for connection to an external device by the end user, thus preventing the inventive device from monopolizing the computer serial port such that it might not be available for its original intended purpose. During the brief instant during which the intelligent communications device is interacting with the personal computer, normal communications through that serial port is interrupted. However, normal communications are restored as soon as the interaction is completed. In accordance with the desire to make the inventive intelligent security device simple to install and use, unique circuitry is incorporated which allows the device to be powered from a host computer, as for example via the RS-232 port.

Another feature of the present invention is that access to the microprocessor of the present invention is not limited to security purposes alone. The microprocessor within the present invention, when active, appears as an adjunct computer connected to the primary computer via the primary computer's serial port. A programmer may employ this feature to speed up the subject program by utilizing the intelligent security device as a coprocessing device, thus speeding up operation of the program. It should be noted that this feature itself provides an additional security function, in that causing operation of the program to be interdependent with operations of the intelligent security device further insures that the device must be in place in order for the program to function.

Because the software required for operation of the inventive security device resides inside the device in encrypted form, simple mechanical and electrical duplication of the device will not result in a workable duplicate of the device, as the encrypted software cannot be replicated.

An advantage of the present invention is that physical duplication of the intelligent security device will not result in a unit which will allow access to protected software.

A further advantage of the present invention is that the high degree of interaction between the inventive intelligent security device and protected software prevents, for all practical purposes, modification of the software to allow it to function out of the presence of the security device.

Yet another advantage of the present invention is that encryption and other data stored within the microprocessor of the inventive intelligent security device cannot be retrieved for transfer to another device using any known technology.

Still another advantage of the present invention is that it is easily installed by an end user and may be easily transported to alternative sites, if such transport is authorized within the scope of a software license.

Yet another advantage of the present invention is that the intelligent security device is economical to produce and reliable in operation.

Still another advantage of the present invention is that it is sufficiently versatile to allow programmers to use the invention to employ a nearly infinite variety of software protection schemes.

Yet another advantage of the present invention is that it does not require a special external power connection, nor does it have an internal power supply which might need periodic maintenance.

Still another advantage of the present invention is that it may be used as a coprocessor to increase the operating speed of a program.

Yet another advantage of the present invention is that access to protected software may be restricted by time, which time parameter is monitored by an internal clock which may not be accessed or altered by an end user.

Still another advantage of the present invention is that the unique circuitry provides a means for achieving the inventive goals while avoiding the need for an additional power source.

Yet another advantage of the present invention is that it does not interfere with the normal operations of a computer.

These and other objects and advantages of the present invention will become clear to those skilled in the art in view of the description of the best presently known modes of carrying out the invention and the industrial applicability of the preferred embodiments as described herein and as illustrated in the several figures of the drawing.

BEST MODE FOR CARRYING OUT INVENTION

The best presently known mode for carrying out the invention is an intelligent security device which is interactive with a host computer through a serial communications port of the host computer. The predominant expected usage of the inventive intelligent security device is in the data processing industry, particularly in applications of proprietary software wherein a means to prevent unauthorized use or distribution of the software is desirable.

Figure 1:
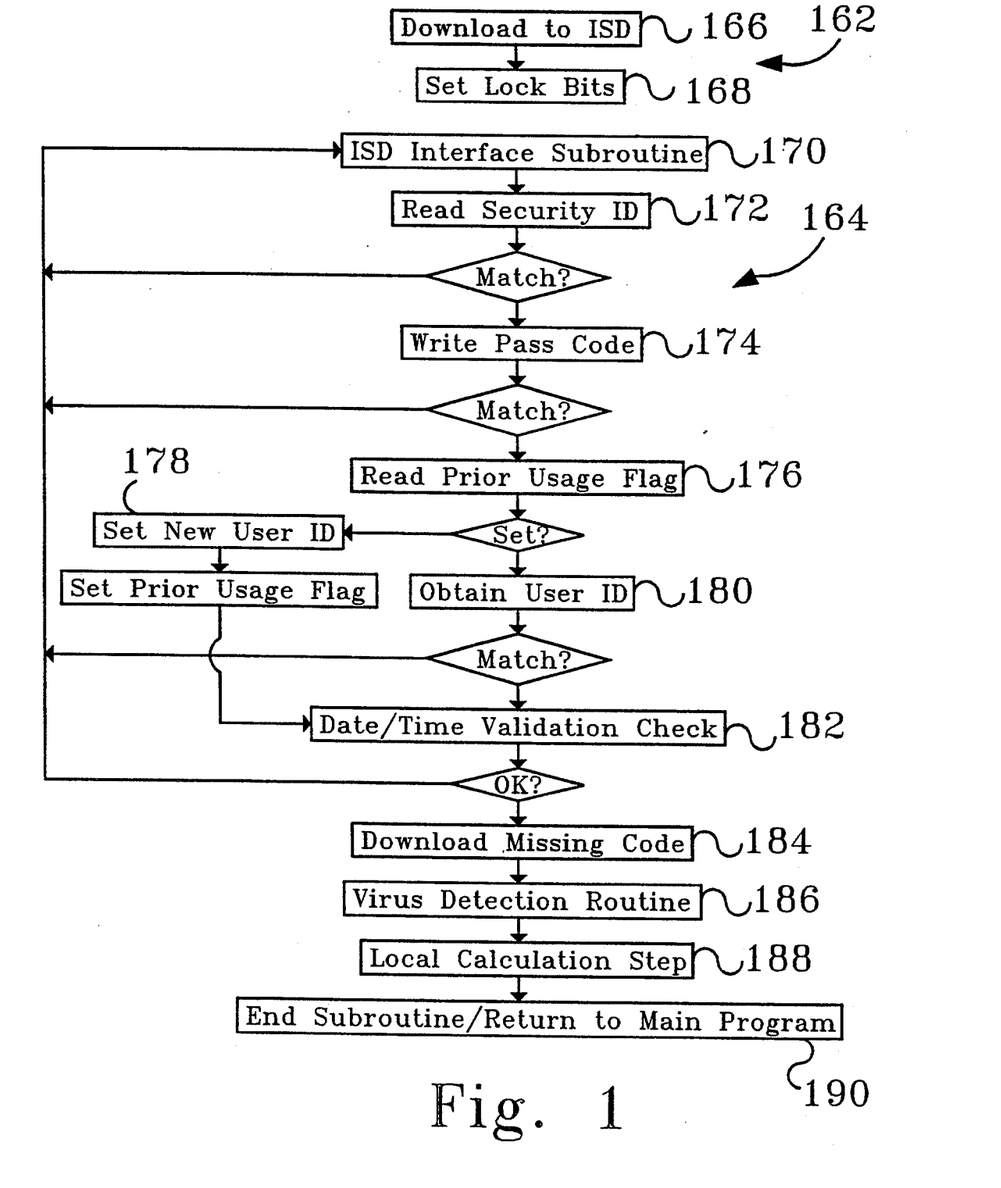
FIG. 1 is a functional block diagram of an intelligent security device, according to the present invention.

The intelligent security device ("ISD") of the presently preferred embodiment of the present invention is illustrated in the functional block diagram of FIG. 1 and is designated therein by the general reference character 10. In physical appearance, the ISD 10 is not unlike a conventional computer cable adapter plug. As can be seen in the diagram of FIG. 1, functional components of the best presently known embodiment 10 of the invention include a central processing unit ("CPU") 12, a universal asynchronous receiver/transmitter ("UART") 14, a memory portion 16, a timing and control portion 18, a power supply 20, a system clock 21, an RS-232 to TTL data conversion portion 22, a data communication switch portion 24, a system interrupt portion 26, and a reprogram interface portion 28. A subsystem interacting network 30 provides a means for communication within the above listed portions of the ISD 10 and between the ISD 10 and a personal host computer ("PC") 32, and further between the PC 32 and a computer peripheral device serial connector 34. The CPU 12, the UART 14, the memory portion 16, and the timing and control portion 18 are all subsystems of a microprocessor 36.

In brief, communications between the PC 32 and the computer peripheral device connector 34 may be temporarily disconnected by the data communication switch 24 while communications between the PC 32 and the ISD 10 are enabled. In this condition, communications from the PC 32 are converted from RS-232 levels to TTL levels within the RS-232 data conversion portion, while communications generated within the ISD 10 are converted therein from TTL levels to RS-232 levels for transmittal to the PC 32. The power supply 20 takes power from the personal computer 32 and provides operating power to the ISD 10 therefrom, and the system clock 21 provides an operating clock pulse for operation of the microprocessor 36. The system interrupt 26 provides a means to interrupt normal operation of the ISD 10 to allow the ISD 10 to communicate with the PC 32.

Figure 2:
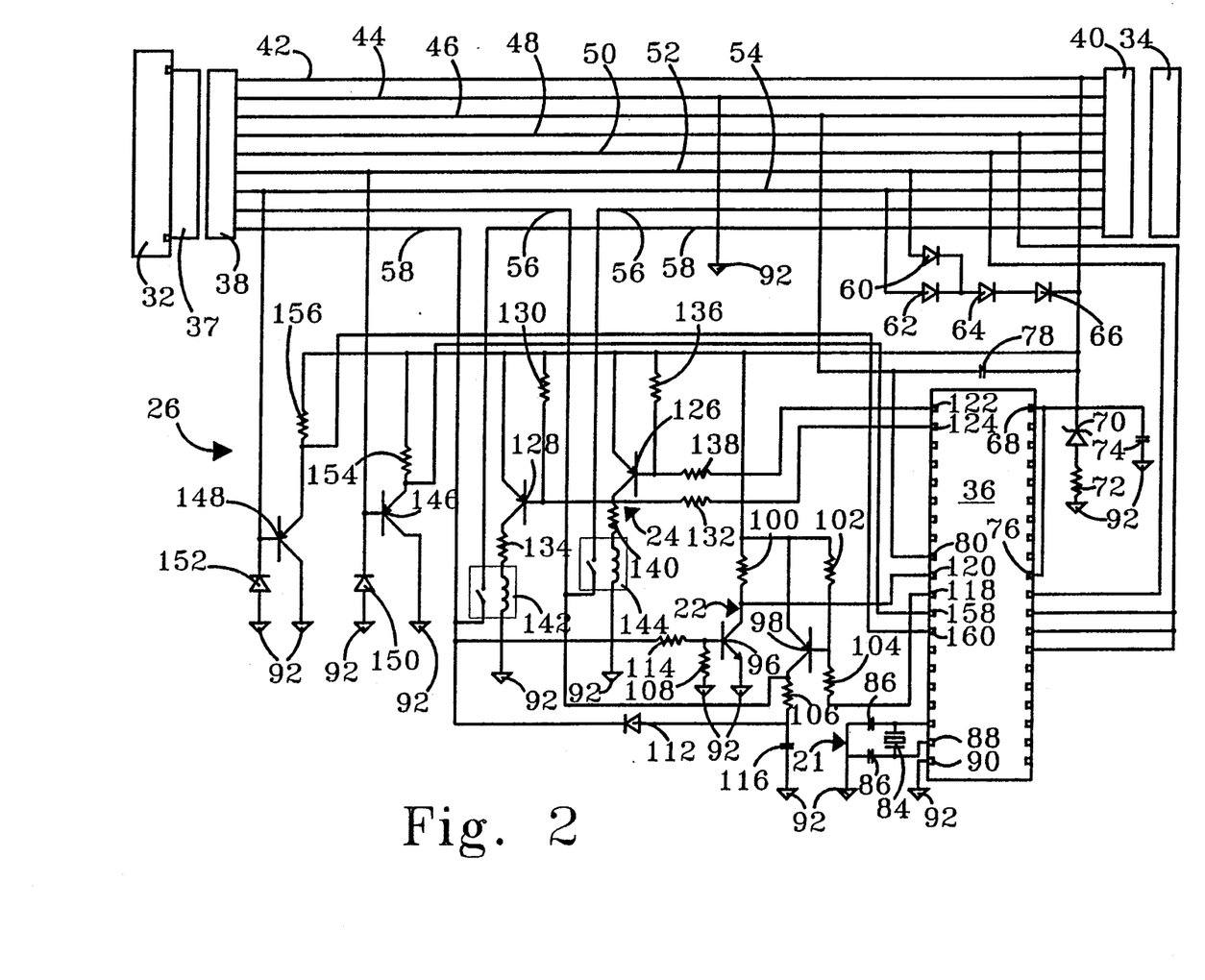
FIG. 2 is a detailed schematic diagram of an intelligent security device, according to the present invention.

FIG. 2 is a schematic diagram of the best presently known embodiment 10 of the invention. In keeping with the fact that the best presently known embodiment 10 is adapted to fit on the computer serial output port 37 of the host computer 32, the ISD 10 has a female connector 38 complying with the RS-232 25 pin standard for connection to the computer serial output port 37 and a male connector 40 for connection to the computer peripheral device serial connector 40. The female connector 38 and the male connector 40 are interconnected, as shown in the drawing of FIG. 2, with a VCC line 42, a ground line 44, a reset line 46, a P2.X line 48, a PSEN# line 50, an INT 0 line 52, an INT 1 line 54, a receive data line 56 and a transmit data line 58.

Within the microprocessor 36 are the CPU 12 (FIG. 1), the UART 14 (FIG. 1), the memory 16 (FIG. 1) and the timing and control portion 18, as have been previously disclosed. The microprocessor 36 used in the presently preferred embodiment of the present invention is a Dallas 5000T~ type, although any of the 8X51~ type series might be used interchangeably. Further, any other microprocessor having the essential characteristics described herein, which might now exist or which might be developed in the future, could be used, with appropriate adaptive circuitry as required, to practice the present invention.

Power for the operation of the ISD 10 is obtained from the INT 0 line 52 and from the INT 1 line 54 through a first isolation diode 60 and a second isolation diode 62. A first clamping diode 64 and a second clamping diode 66 are provided to insure proper voltage differential at a microprocessor VCC terminal 68. A voltage regulator zener diode 70, a current limiting resistor 72 and a surge protection capacitor 74 regulate and smooth power supplied to the microprocessor 36. As can be seen in the drawing, power is supplied to the VCC terminal 68 and to an EA# terminal 76. In accordance with normal practice, a reset timing capacitor 78 is connected between the VCC terminal 68 and a reset terminal 80. The system clock 21 has a crystal 84 and two clock capacitors 86 connected between an XTAL1 terminal 88 and an XTAL2 terminal 90, and a ground 92, as shown in the drawing of FIG. 2. A VSS terminal 94 of the microprocessor 36 is connected directly to ground 92.

The RS-232 to TTL data conversion portion 22 has a first logic conversion transistor 96 and a second logic conversion transistor 96, which are biased as shown using a first converter load resistor 100, a second converter biasing resistor 102, a third converter biasing resistor 104, a fourth converter load resistor 106 and a fifth converter biasing resistor 108. A conversion diode 112 blocks positive going excursions of signal from the transmit data line 58 to the second data conversion transistor 98. A limiting resistor 114 reduces voltage excursions of signal appearing at the first data conversion transistor 96, and a blocking capacitor 116 provides a signal path to ground 92. The net effect of the RS-232 to TTL data conversion portion 22 is to cause signal appearing at RS-232 levels at the transmit data line 58 to be converted to TTL levels at a P3.1 terminal 118 of the microprocessor 36. Similarly, signals appearing at TTL levels at a P3.0 terminal 120 are converted to RS-232 levels as they appear on the receive data line 56.

A P1.0 terminal 122 and a P1.1 terminal 124 of the microprocessor 36 are utilized to produce outputs which, as desired, drive into conduction a first relay driver transistor 126 and a second relay driver transistor 127 of the data communications switch 24. The first relay driver transistor 126 is biased as shown in the drawing of FIG. 2 by a first driver biasing resistor 130, a second driver biasing resistor 132 and a third driver load resistor 134, while the second relay driver transistor 128 is biased by a fourth driver resistor 136, a fifth driver resistor 138 and a sixth driver load resistor 140. The first relay driver transistor 126 is connected to actuate a first normally open relay 142 and the second relay driver transistor 128 is connected to actuate a second normally open relay 144. As can be seen in the drawing of FIG. 2, the normally open relays 142 and 144 interrupt the receive data line 56 and the transmit data line 58 such that communications along the receive data line 56 and the transmit data line 58 between the PC serial connector 37 and the peripheral device serial connection 34 may be connected or disconnected depending upon the status of the P1.0 terminal 122 and the P1.1 terminal 124. As can be appreciated, this enables a programmer to temporarily effectively disconnect the peripheral device serial connection 34 from the PC serial connector 37 to allow communication of the ISD 10 through the PC serial connector 37.

The system interrupt portion 26 of the ISD 10 has a first voltage converter transistor 146 and a second voltage converter transistor 146, a first interrupt diode 150, a second interrupt diode 152, a first interrupt biasing resistor 154 and a second interrupt biasing resistor 156. Interrupt signals appearing at a P3.2 terminal 158 and a P3.3 terminal 160 of the microprocessor 36 are changed in voltage level by the voltage converter transistors 146 and 148 such that the interrupt lines 52 and 54 are pulled down, as required, by voltages appropriate to the RS-232 standard. In order to ensure that one skilled in the art can easily duplicate the best presently known embodiment 10 of the present invention, the following TABLE A is included which lists the values and types of components utilized by the inventors.

TABLE A

| 60 | first isolation diode | 1N914 |
|---|---|---|
| 62 | 2nd isolation diode | 1N914 |
| 64 | 1st clamping diode | 1N914 |
| 66 | 2nd clamping diode | 1N914 |
| 70 | voltage reg. zener diode | 1N4733 |
| 72 | current limiting resistor | 100Ω |
| 74 | surge protection capacitor | 100 μF |
| 78 | reset timing capacitor | 10 μF |
| 84 | crystal | 3.579545 MHz |
| 86 | clock capacitors (2) | 30 pF |
| 96 | 1st logic conversion transistor | 2N3904 |
| 98 | 2nd logic conv. transistor | 2N3906 |
| 100 | 1st converter load resistor | 4.7 KΩ |
| 102 | 2nd converter biasing resistor | 4.7 KΩ |
| 104 | 3rd converter biasing resistor | 4.7 KΩ |
| 106 | 4th converter load resistor | 3.1 KΩ |
| 108 | 5th converter biasing resistor | 15 KΩ |
| 112 | conversion diode | 1N914 |
| 114 | limiting resistor | 22 KΩ |
| 116 | blocking capacitor | 10 μF |
| 126 | 1st relay driver transistor | 2N3906 |
| 128 | 2nd relay driver transistor | 2N3906 |
| 130 | 1st driver biasing resistor | 4.7 KΩ |
| 132 | 2nd driver biasing resistor | 4.7 KΩ |
| 134 | 3rd driver load resistor | 280Ω |
| 136 | 4th driver biasing resistor | 4.7 KΩ |
| 138 | 5th driver biasing resistor | 4.7 KΩ |
| 140 | 6th driver load resistor | 280Ω |
| 142 | 1st normally open relay | Clare MRB5001A205 |
| 144 | 2nd normally open relay | Clare MRB5001A205 |
| 146 | 1st voltage converter transistor | 2N3906 |
| 148 | 2nd voltage converter transistor | 2N3906 |
| 150 | 1st interrupt diode | 1N914 |
| 152 | 2nd interrupt diode | 1N914 |
| 154 | 1st interrupt biasing resistor | 10 KΩ |
| 156 | 2nd interrupt biasing resistor | 10 KΩ |

As has been previously discussed herein, the method of using the inventive IDS 10 is, in many respects, limited only by the imagination of the programmer employing the invention. Without limiting the scope of the invention, or its use, the inventors submit the flowchart of FIG. 3 as a sketch of an intended method for using the inventive IDS 10. It is believed that any component programmer could easily implement the flowchart of FIG. 3, as well as many significant variations thereof. It should be noted that each of the process steps listed in FIG. 3 consist of several simple program operations, as one familiar with the programming of such operational process steps will readily recognize.

Figure 3:
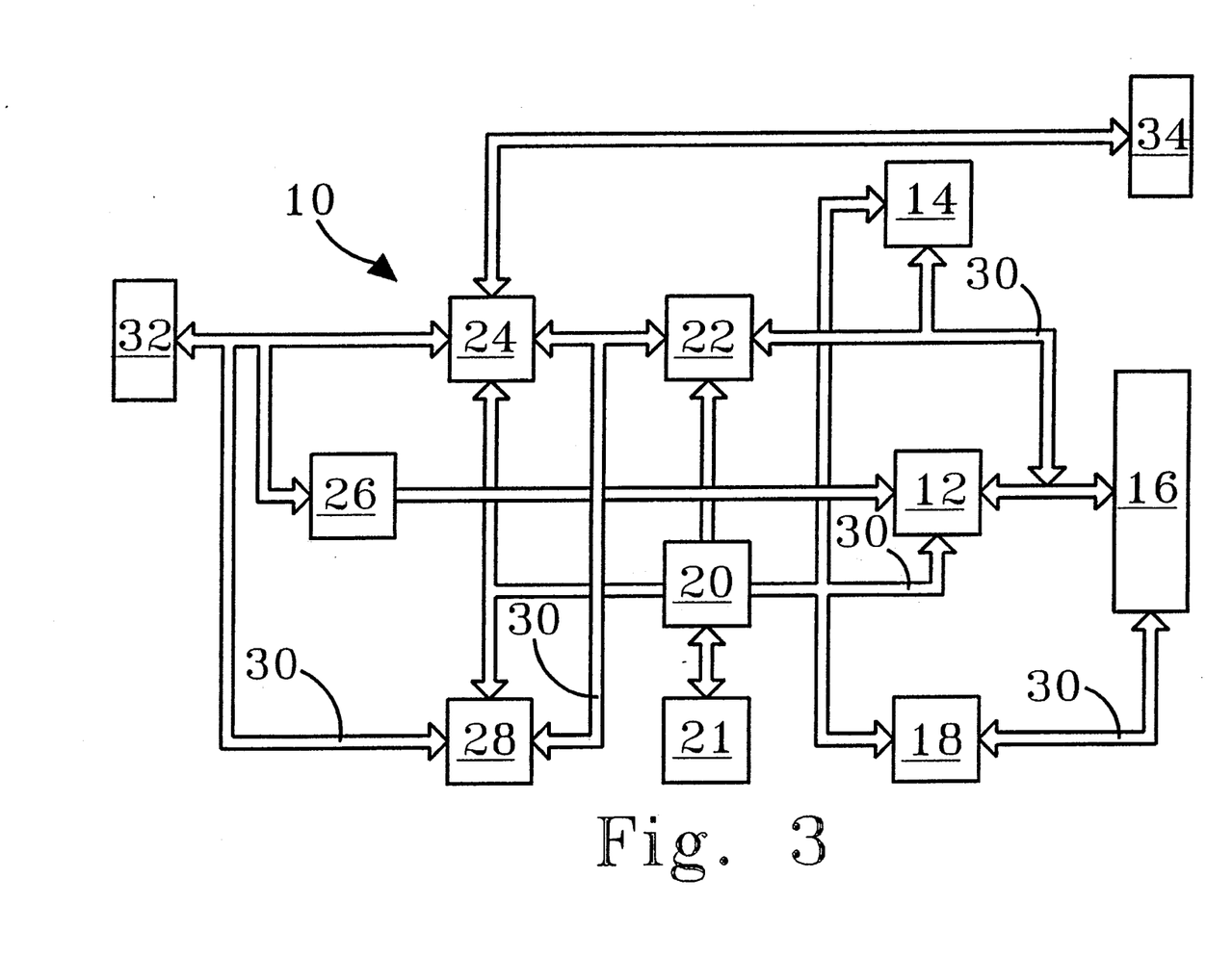
FIG. 3 is a flow chart showing an example of a method of software protection, according to the present invention.

It is illustrated in FIG. 3 that an ISD program routine 162 is required to initially program the ISD 10. This can be accomplished when the ISD is a fully assembled unit through the RS-232 female connector 38 (FIG. 2) or, alternatively, the microprocessor 36 (FIG. 2) can be accessed directly using well known equipment and methods to program the microprocessor 36. Those familiar with the operation of the microprocessor 36 type specified herein will recognize that a 32 byte code is required to program the microprocessor 36 in encrypted format, and that one has to know the 32 key bytes in their proper sequence in order to read information therefrom. Furthermore, once two specific lock bits in the microprocessor 36 are set, externally fetched code can not access internal program memory, further programming is disabled, and program verification (even with the correct encryption codes) is also disabled. The only way to unlock the microprocessor 36 once it is locked is to erase all of the memory 16 (FIG. 1). In the example of FIG. 3, programming and information necessary to carry out an ISD application subroutine 164 is loaded into the ISD in a download to ISD operation 166, and then a set lock bits operation 168 accomplishes the locking process here described. The ISD 10 is then ready to be shipped with accompanying software for use as described hereinafter.

In the example of FIG. 3, an ISD interface subroutine 170, which is within the protected software of concern, directs the host computer 32 (FIG. 2) to perform a security ID code read routine 172 to read a code from the ISD 10 (FIG. 1) and checks to make sure the security ID code matches a code stored within the protected software. If there is a match the fact that the ISD 10 is that which is intended and authorized for operation with the software in question is confirmed and the process proceeds. If there is no match, control is returned to the ISD interface subroutine 170 to either allow another try or to shut down operation of the protected software. It should be noted that, if desired, the main program protected software could, by way of example only, be shut down for a specified period of time, the passage of such time being monitored and determined by the timing and control portion 18 of the ISD 10.

Having matched a security ID code as described above, the process of the example of FIG. 3 proceeds to a pass code write routine 174 to write a pass code from the operative software within the host computer 32 (FIG. 2) to the ISD 10. The ISD 10 then actively compares the pass code to verify that it is as expected. It should be noted that both an expected pass code and the software for making this comparison are stored in encoded form within the ISD 10. If there is a match the fact that the protected software is that which is intended and authorized for operation with the ISD 10 is confirmed and the process proceeds.

Next, in the example of FIG. 3, a prior usage flag check 176 is performed to determine if a prior usage flag has been set. If the flag has not been set, indicating that the protected software has not been previously used, the operator is asked to enter a user pass ID (pass word) within a set new user ID step 178, and the prior usage flag is set in a prior usage flag set step 180 prior to proceeding. Alternatively, if the prior usage flag has been previously set, the program asks that the user enter an end user ID, which should match that entered during the first usage of the protected software, in an obtain user ID step 180. If the newly entered user ID matches that previously stored within the ISD during the set new user ID step 178 upon the first usage of the software, the program is allowed to proceed. It should be noted that the operations described in this paragraph are of use both to the manufacturer of the software and to the purchaser, because the purchaser may, if he wishes, prevent those other than himself from operating the software, and thus he may deny access to private information contained in files which may only be accessed through the software.

Next, in the example of FIG. 2, a date/time validation check step 182 is accomplished. As has been previously discussed herein, one of the unique features of the present invention is that software may be reliably secured from usage outside of an authorized time frame. For example, a manufacturer may lease the software for a fixed period of time or, alternatively, a manufacturer may let a potential purchaser use the software for a fixed period of time on a trial basis. For the purposes of the example, we will assume that during the download to ISD operation 166, the manufacturer has programmed the ISD to allow the program to continue only if certain preprogrammed time conditions are met. At the date/time validation check step 180 the ISD 10 (FIG. 2) confirms that the time obtained from the system clock 21 (FIG. 2) is within the preset conditions. Assuming that the conditions are met, the program is allowed to proceed.

Next, having demonstrated that the program, ISD, user, and time are all within parameters which have been delineated as acceptable, as described above, in the example of FIG. 3, a download missing code step 184 loads a necessary portion of the protected software, which portion has been stored within the ISD 10, into the host computer to enable the operation of the program.

Since the inventive ISD has both memory space and computational power available, both of which may be utilized by programmers in ways limited only by the imagination of the programmer, the best presently known embodiment 10 of the invention, as exemplified in the example of FIG. 3, has a conventional virus detection program stored within the ISD. In accordance with the example of FIG. 3, the ISD 10 next performs a virus detect routine 186 on the operative software. It should be noted that the type of virus detection routine used and object of its operation is not limited to this example. For instance, the virus detection program could be caused to operate only on files imported into the host computer or, alternatively, to check all files resident on a hard disk (not shown) of the computer.

Next, in the example of FIG. 3, the ISD is asked to perform a local calculation step 188. This is yet another tactic of the security scheme, as operation of the protected software may be interrupted if an expected answer is not returned. As has been previously discussed herein, the ability of the ISD 10 to perform calculations may also be employed for the purpose of relieving the host computer 32 of some tasks, and thus speeding up operation of the protected software. Finally, in the example of FIG. 3, the ISD application subroutine 164 is ended and an end subroutine/return to main program step 190 is accomplished, While several types of software protection schemes are presented in the example of FIG. 3, it should be remembered that it is an object of the present invention to provide a security device which is sufficiently versatile to implement a multitude of such strategies, including those presented herein by way of example, other known strategies, and others which might be devised in the future.

As is shown above, in great part, the intelligent security device 10 according to the present invention resembles some prior art conventional computer security devices in many respects. The substantial difference exists in the inclusion of the microprocessor 36 having a self encryption and locking function, and further in the associated circuitry which makes possible the use of the microprocessor as described herein. Furthermore, the intelligent security device 10 according to the present invention also closely resembles many conventional computers which might be connected in an interactive mode to the PC serial output port 10. The substantial differences between the inventive ISD 10 and conventional computers lies in inclusion of a microprocessor having the self encryption and locking function described herein, which prevents access to and copying of encrypted information within the ISD 10, and further in the unique circuitry which allows the operation of the ISD 10 without an additional power source, which enables practical application of the microprocessor 36 to the inventive purpose. The use of specialized materials is not envisioned nor are any special constructions required.

Various modifications may be made to the invention without altering its value or scope. For example, the inventive method for software security could be embodied in hardware means adapted to hook to parallel port, bus, or other communications means of a computer. In fact, while the best presently known embodiment 10 of the invention has been described herein as being adapted for connection to a RS-232 serial port, embodiments adapted for use with RS-422, RS-423 and RS-499, such as are used on Apple~ and other types of computers, are specifically envisioned by the inventors as being within the scope of the present invention, Similarly, modifications of the circuitry of the best presently known embodiment 10 of the invention to provide more or fewer features would render a device entirely within the scope of the invention. As just one example, a device might be built which does not include the data communications switch 24 and the male connector 40 such that communications with the peripheral device serial connector 34 are not possible, but which device does incorporate all of the inventive aspects of software security.

Another conceivable change is to vary the above described method for using the ISD 10. Since the intended purpose of the ISD 10 is to provide users with an almost infinite variety of means for including the device in software protection schemes, it is envisioned that schemes not yet devised are within the intended scope of the invention.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The intelligent security device may be widely used in a great variety of software protection applications. The predominant current usages are for the prevention of the unauthorized use of software in personal computers and workstations having an RS-232 serial communications port.

The intelligent security device of the present invention may be utilized in any application wherein conventional hardware security keys are used. The main area of improvement is in the circuitry which provides for the interface of the microprocessor 36 with a host computer. Because the intelligent security device is itself a computer which interacts with the host computer in a manner very similar to that of any computer pair for which intercommunication means are provided, it may be programmed to interact with the host computer in an almost limitless variety of ways. For example, although it is not a primary purpose of the intelligent security device, a programmer can easily access it to help the host computer perform complicated calculations, thereby increasing the speed and power of the host computer.

Of more relevance to the intended purpose of the intelligent security device are its abilities to interrupt communications through the serial port to which it is attached, and its ability to either provide or fail to provide information to the host computer which will enable or disable the use of software which is dependent in some way upon interaction of the host computer and the intelligent security device.

The inventors believe that the present invention may be used to implement any known identification and/or cross checking security scheme, as well as a nearly infinite number of possible protection schemes which might be devised in the future. By way of example, a software program might request the inventive security device to calculate the answer to a complex calculation using programming residing within the device. The software then checks for a correct answer before proceeding. Yet another example is that a small but vital portion of the program might be stored within the inventive security device and must need be retrieved during each new activation of the program. Still another example is that a portion of the program must need be decrypted by a decryption program residing within the inventive security device. Of course, multiple levels of program encryption, such as encryption schemes relying upon information which is stored in part within the security device and in part within the software itself, are possible. Any of the above examples would function to ensure that the program could not operate without the inventive security device being in place, which would accomplish at least one of the possible purposes of the invention.

Yet other examples might be to have the key check to ascertain that the copy of the software is that for which it was intended to be used (for instance, where software is caused to store a number within its files which is altered upon each successive installation of the software into a computer), or to check the computer system configuration as a means of assurance that the machine to which the intelligent security device is attached is that one for which the software is licensed.

Yet another example of the usefulness of the device pertains to the use of a computer as a satellite terminal of a distributed system within which the protected program is installed. The inventive security devices might, for example, be attached to the satellite computers to prevent restricted programs or portions thereof from being retrieved or used from the system central computer. Alternatively, the inventive security device might be attached to the system central computer to control such access.

Since the intelligent security device of the present invention may be readily constructed and is physically and electronically compatible with existing computer equipment, it is expected that it will be acceptable in the industry as substitutes for the conventional security devices and as an improvement thereon. For these and other reasons, it is expected that the utility and industrial applicability of the invention will be both significant in scope and long-lasting in duration.

We claim:

1. A software protection device for connection to a communications port of a host computer, comprising:
  a memory for storing data therein in an encoded form;
  processing means for encoding data to be stored in said memory, and further for decoding data to be retrieved from said memory, and further for performing calculations on the data;
  data level conversion means for connecting said processing means to the host computer such that data output from the host computer is converted into a form usable by said processing means, and further such that data output from said processing means is converted into a form usable by said host computer; and
  power isolation means for interconnecting the software protection device to the host computer such that the software protection device draws operating power from the host computer, wherein;
  said processing means uses a data encryption scheme stored in said memory to encode and to decode the data;
  a code is required to access said data encryption scheme
  said memory and said processing means being components of the software protection device provided for supplementing the computer which are housed together in a unitary integrated circuit device package such that data contained within said memory can only be retrieved in usable form by the operation of decoding the data through said processing means.

2. The software protection device of claim 1, and further including:
  data line interrupt means for selectively temporarily interrupting a plurality of computer serial interface data lines, such that the flow of data through the communications portion of the host computer can be temporarily interrupted to enable communications between said processing means and the host computer, and further for selectively temporarily reinstating the plurality of computer serial interface data lines such that the host computer can send and receive data through the communications port.

3. The software protection device of claim 1, wherein:
  said memory includes instructions for causing said processing means to provide a protection device identifying code to the host computer.

4. The software protection device of claim 1, wherein said memory includes instructions for:
  causing said processing means to read a software identifying code from the host computer;
  compare, within said processing means, the software identifying code to an expected software code residing within the microprocessor; and
  permit the host computer to proceed in operation when the software identifying code matches the expected software code.

5. The software protection device of claim 1, wherein said memory includes instructions for:
  reading from a clock with said processing means a current time;
  comparing the current time to a time parameter limitation residing within said processing means; and
  permitting the host computer to proceed in operation when the current time is within the time parameter limitation.

6. The software protection device of claim 1, wherein said memory includes instructions for:
  causing said processing means to perform a calculation;
  returning a calculated result of the calculation to the host computer;

comparing, within the host computer, the calculated result to an expected result residing with the host computer; and permitting the host computer to proceed in operation when the calculated result matches the expected result.

7. The software protection device of claim 1, wherein said memory includes instructions for:

causing said processing means to act as a coprocessor in that the host computer can assign calculations to said processing means, the results of which are returned to the host computer.

* * * * *